(12) United States Patent
Tranchida

(10) Patent No.: US 6,312,211 B2
(45) Date of Patent: *Nov. 6, 2001

(54) SEMI-AUTOMATED LOAD BALANCING MECHANISM

(75) Inventor: Joseph G. Tranchida, St. Claire, MI (US)

(73) Assignee: Protomark Corporation, Clinton Township, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,956

(22) Filed: Jun. 25, 1998

(51) Int. Cl.[7] ....................................................... B25J 1/00
(52) U.S. Cl. ............................ 414/680; 212/287; 414/17
(58) Field of Search ................................ 414/680, 561, 414/17; 212/333, 334, 335, 287; 901/49, 4

(56) References Cited

U.S. PATENT DOCUMENTS

| | | |
|---|---|---|
| 3,272,347 | * 9/1966 | Lemelson .......................... 212/334 X |
| 4,697,979 | * 10/1987 | Nakashima et al. ............... 901/49 X |
| 4,834,440 | 5/1989 | Kato . |
| 5,037,267 | 8/1991 | Warner et al. . |
| 5,117,739 | 6/1992 | Maher et al. . |
| 5,577,433 | 11/1996 | Henry . |

FOREIGN PATENT DOCUMENTS

2803895 * 10/1979 (DE) ..................................... 212/325

* cited by examiner

Primary Examiner—Donald W. Underwood

(57) ABSTRACT

A semi-automated load balancing mechanism includes a load balancing arm supported for vertical swingable movement and a second arm. The second arm is mounted on a distal end of the load balancing arm for horizontal movement. The second arm has a part holder on a distal end thereof for receiving and supporting a load thereon. An actuator is disconnectably coupled to the load balancing arm for moving it while allowing manual movement independent of the actuator.

14 Claims, 6 Drawing Sheets

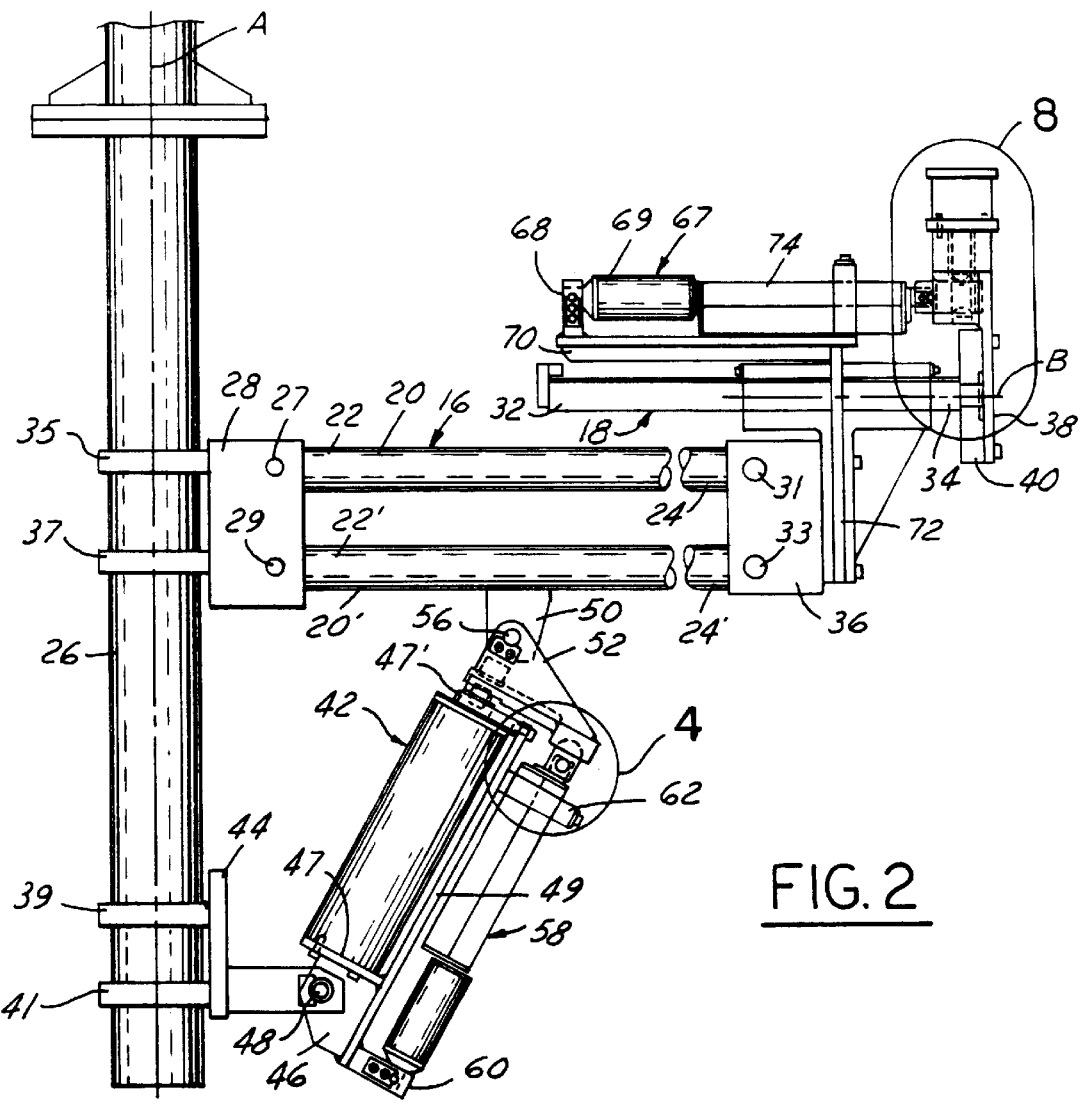
FIG. 2
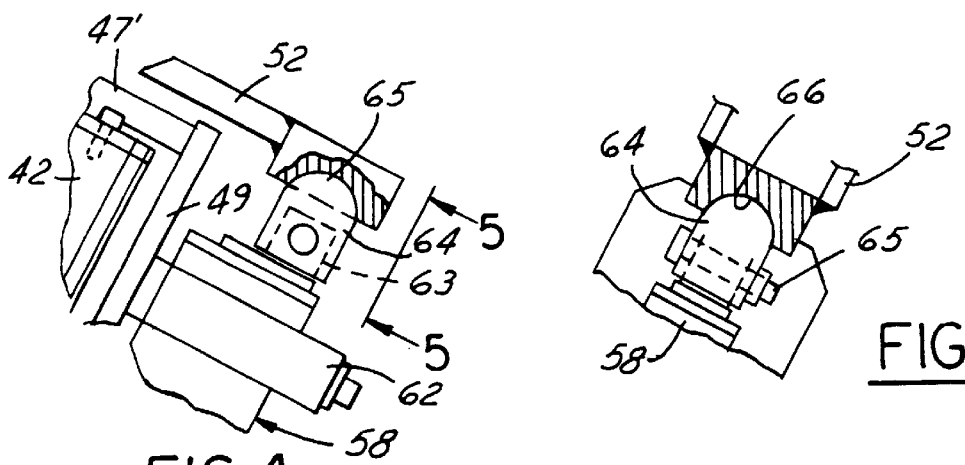
FIG. 4
FIG. 5

SEMI-AUTOMATED LOAD BALANCING MECHANISM

TECHNICAL FIELD

The present invention relates generally to load balancing mechanisms for facilitating handling of parts by a worker in assembly operations and, more particularly, to semi-automated load balancing mechanisms which automatically move parts between supply and assembly lines.

BACKGROUND ART

Workers use conventional load balancing mechanisms to handle equipment such as heavy air driven tools and to aid in placement for mounting parts in assembly line operations. These load balancing mechanisms supply supporting forces in a vertical direction to counter gravitational force for supporting a load and also structure to resist torque and vibration associated with tool operations. Typical load balancing mechanisms include a two-piece articulated arm of a straight cross section pivotally connected to a support post about which the arm is rotatable. The arm is pivotal for movement in a vertical plane and also rotatable about an axis of rotation horizontally displaced from an axis of the support post. A hinged connection allows the two sections of the arm to be selectively moved by a worker for placement of a load located at a distal end of one of the arms within the reach of the articulated arm.

In this conventional arrangement of the load balancing mechanism, deflection is created in the support post by the weight of the arm and is increased by the application of a load on the arm. This deflection establishes a home position, due to the combined effect of deflection of the axis of rotation and the axis of rotation being displaced from the axis of the support post, which is at a lowest elevational position for the arm about the post. The arm drifts to this home position if left uncontrolled or unattended. This drift is further exaggerated by the hinged construction of the articulated arm and makes controlling the arm mandatory.

The straight cross sectional shape of the articulated arm also necessitates applying a greater lifting force to the arm to counter the weight of a load applied to the end of the arm as the greatest bending movement occurs at the connection of the support post and arm.

U.S. Pat. No. 5,037,267, entitled Load Balancing Mechanism, hereby incorporated by reference, discloses an improved load balancing mechanism which overcomes the above noted deficiencies of conventional load balancing mechanisms. However, the improved load balancing mechanism is designed solely for manual use by a worker.

A problem with load balancing mechanisms designed solely for manual use is that too much time and energy is wasted. For instance, in automobile assembly operations for placing an automobile seat into an automobile frame, a worker initially uses the mechanism to pick up a seat from a supply line or pickup position. Then, the worker moves the mechanism away from the supply line towards the assembly line to position the seat adjacent an automobile frame on the assembly line. The worker then uses the mechanism to place the seat into the automobile frame. To repeat the process for the next automobile frame coming down the assembly line, the worker moves the mechanism back to the supply line adjacent the next seat coming down the supply line to use the mechanism to pick up that seat.

Time and effort could be saved if the mechanism automatically moved between a part pickup position where it retrieves a part, and an "operator" position, for example adjacent the assembly line; at which operator position the worker could take over and manually move the part carried by the mechanism to mount the part into an automobile body or the like.

Thus, what is needed is an improved load balancing mechanism which overcomes the deficiencies associated with conventional load balancing mechanisms and is designed for combined automated and manual use by a worker.

SUMMARY OF THE INVENTION

Accordingly, it is an object of the present invention to provide a semi-automated load balancing mechanism designed for automatic and manual use.

It is another object of the present invention to provide a semi-automated load balancing mechanism which automatically moves between predetermined positions to facilitate part pickup and placement.

It is a further object of the present invention to provide a semi-automated load balancing mechanism which automatically moves between predetermined positions having given heights, given angles, and given longitudinal displacements relative to the mechanism.

In carrying out the above objects and other objects, the present invention provides a semi-automated load balancing mechanism having automatic and manual modes. In the disclosed embodiment the mechanism includes a post having a vertical axis. A first arm is pivotally mounted to the post for upward and downward pivotal movement. Constant force balancing means are connected to the post and the first arm for equilibrium balancing upward and downward pivotal movement of the arm and a load supported by the first arm. A first actuator is connected to the post and the first arm. The first actuator is extensible and retractable to pivotally move upward and downward the first arm. A controller is connected to the first actuator. The controller causes the first actuator to automatically move the first arm to a selected vertical position and disables the first actuator once the first arm is at the selected vertical position to allow an operator to manually move the first arm to move the load in a vertical direction.

The mechanism may also include rotating means for rotating the first arm about the vertical axis of the post to horizontally displaced positions. The controller is connected to the rotating means and causes the rotating means to automatically move the first arm to a selected horizontal position and disables the rotating means once the first arm is at the selected horizontal position to allow an operator to manually move the first arm to move the load in a horizontal direction.

The mechanism may further include a second arm mounted to the first arm. The second arm is movable along a longitudinal axis relative to the vertical axis of the post to move the load along the longitudinal axis. A second actuator is connected to the first and second arms. The second actuator is extensible and retractable to longitudinally move the second arm. The controller is connected to the second actuator and causes the second actuator to automatically move the second arm to a selected longitudinal position and disables the second actuator once the second arm is at the selected longitudinal position to allow an operator to manually move the second arm to move the load in a longitudinal direction.

The advantages accruing to the present invention are numerous. The controller moves the arms to a part pickup position. The part pickup position will have a given height, a given angle, and a given longitudinal displacement relative to the post. After part pickup, the controller moves the arms to an "operator" position. The operator position will also have a given height, a given angle, and a given longitudinal displacement relative to the post. At the operator position the worker may manually move the part while carried by the arms to place the part.

After the operator uses the arms in the manual mode to place the part, the arms may automatically return back to the part pickup position to get a new part. The transition from automatic to manual mode, or vice versa, may be determined either by the operator actuating a control switch or by the operator positioning the arms in a predetermined position, at which the mechanism would enter the automatic mode to return to the part pickup position. The process is then repeated with the arms automatically and accurately moving between the part pickup and operator positions to facilitate assembly operations. As a result, worker productivity greatly increases with a corresponding reduction in effort.

These and other features, aspects, and embodiments of the present invention will become better understood with regard to the following description, appended claims, and accompanying drawings.

BRIEF DESCRIPTION OF THE DRAWINGS

FIG. 2 is a side elevational view of the semi-automated load balancing mechanism shown in FIG. 1 illustrating the post, the first arm, the piston and cylinder balancing arrangement, the first arm actuator, the second arm, and the second arm actuator;

FIG. 4 is an enlarged view of the corresponding circled area 4 shown in FIG. 2 illustrating the connection between the piston and cylinder arrangement. and the first arm actuator;

FIG. 5 is a view in the direction of arrows 5—5 of FIG. 4;

BEST MODES FOR CARRYING OUT THE INVENTION

Figure 1:
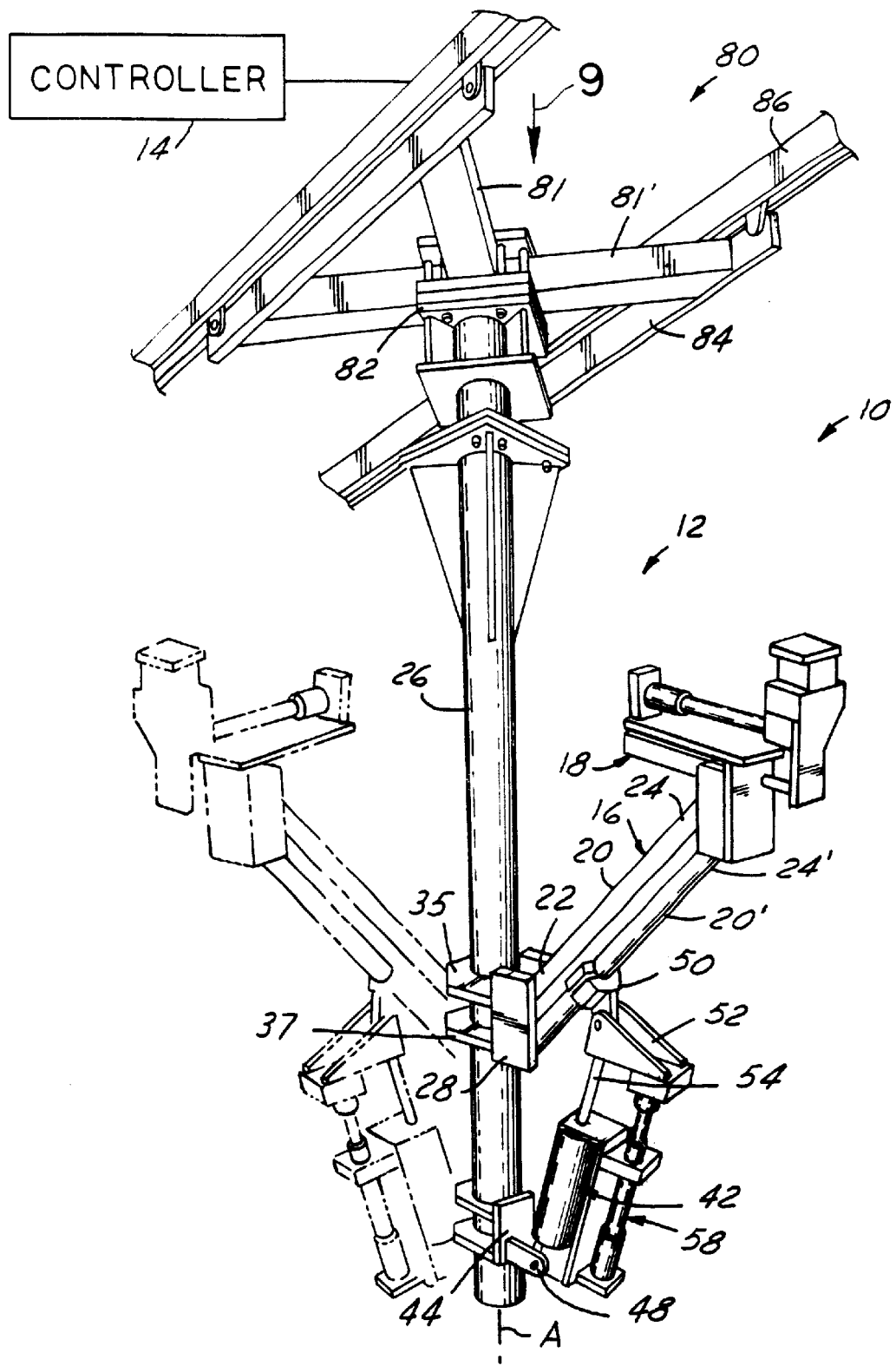
FIG. 1 is a perspective view of a preferred embodiment of a semi-automated load balancing mechanism constructed in accordance with the present invention and mounted on an overhead bridge and trolley arrangement illustrating positions of movement shown in phantom.
Figure 3:
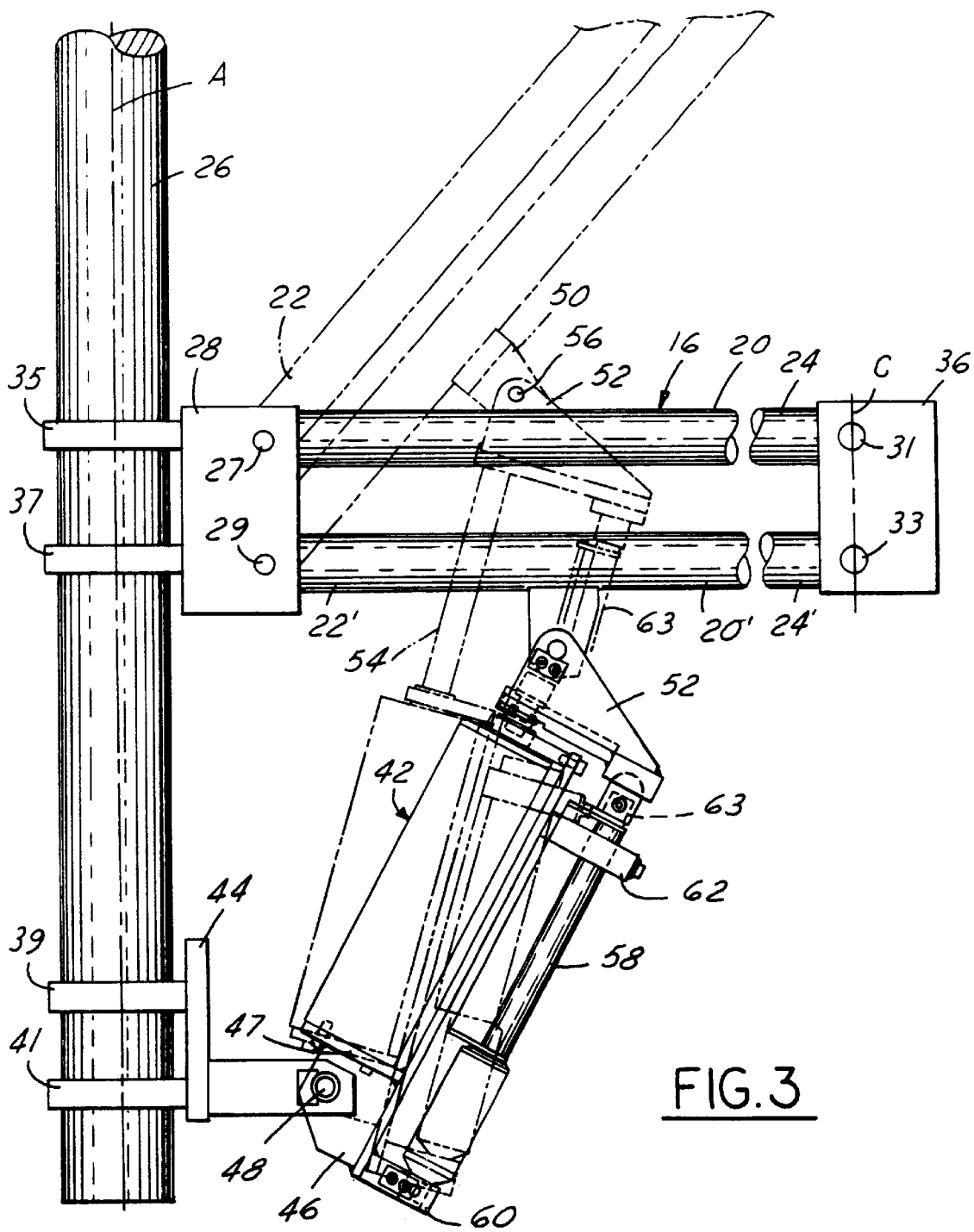
FIG. 3 is a side elevational view of the post, the first arm, the piston and cylinder balancing arrangement, and the first arm actuator illustrating the first arm in a retracted position and in an extended position shown in phantom.

Referring now to FIG. 1, a semi-automated load balancing mechanism 10 in accordance with a preferred embodiment of the present invention is shown. Semi-automated load balancing mechanism 10 includes a load balancing mechanism 12 and a controller 14, such as a programmable logic controller (PLC), connected to the load balancing mechanism. An operator uses load balancing mechanism 12 as a power assist in handling tools and for lifting and mounting parts in assembly operations. Load balancing mechanism 12 also reduces the amount of force required to lift a load as the lifting force is not used to counteract moments due to longitudinal positioning of the load.

Load balancing mechanism 12 provides power assisted movement in the vertical direction and is movable in horizontal and longitudinal directions. Controller 14 controls load balancing mechanism 12 such that the load balancing mechanism has automatic and manual modes.

In the automatic mode, controller 14 controls load balancing mechanism 12 to automatically move horizontally, vertically, and longitudinally between predetermined positions. For instance, controller 14 controls load balancing mechanism 12 to position the load balancing mechanism at a part pickup position having position coordinates x, y, and z adjacent a parts supply line. Load balancing mechanism 12 then retrieves a part such as an automobile seat from the pickup position. Controller 14 then controls load balancing mechanism 12 to automatically move the seat from the pickup position to an automobile frame on an assembly line at an "operator" position having coordinates x', y', and z'.

At the operator position controller 14 then causes load balancing mechanism 12 to operate in the manual mode. The transition from the automatic to manual mode can automatically occur once load balancing mechanism 12 is moved to the operator position. The transition may also occur by the operator actuating a control switch.

In the manual mode, the operator can manually move load balancing mechanism 12 from the operator position to place the seat into the automobile frame. After the seat is placed in the automobile frame, controller 14 controls load balancing mechanism 12 to operate again in the automatic mode. The transition back to the automatic mode from the manual mode can automatically occur in several ways. For example, after a sensor senses the removal of the seat from load balancing mechanism 12, after a predetermined time period, or the like. It may occur by the operator manually returning load balancing mechanism 12 back to the operator position. The transition may also occur by the operator actuating a control switch.

However the transition occurs, back in the automatic mode, controller 14 controls load balancing mechanism 12 to automatically move from the operator or part placement position at the assembly line back to the part pickup position at the supply line to retrieve the next seat coming down the supply line. The process can then be repeated to place the next seat onto the next indexed automobile frame on the assembly line.

As shown in FIGS. 1 and 2, load balancing mechanism 12 includes a first arm 16 and a second arm 18. First arm 16 includes a first parallelogram linkage of two parallel members 20 and 20' pivotally connected at their proximal ends 22 and 22' to a first mount 28, at pivot pins 27 and 29, and pivotally connected at their distal ends 24 and 24' to a second mount 36 at the pivot points 31 and 33. First mount 28 is secured to EL post 26 by bands 35 and 37.

Post 26 is rotatable about its vertical axis A thereby allowing arms 16 and 18 to be swung in a horizontal plane about the vertical axis A. Rotation of post 26 about the vertical axis A eliminates the drifting effect typically associated with conventional load balancing mechanisms because pivoting occurs adjacent the mounting of the post where there is no deflection in the vertical direction.

With continued reference to FIGS. 1 and 2, second arm 18 is an elongated slidable member having first and second ends 32 and 34 and a longitudinal axis B. Second mount 36 mounts second arm 18 to the distal end 24 of first arm 16 and supports the longitudinal axis B thereof in a plane substantially perpendicular to the vertical axis A of post 26 to thereby form an extension of the first arm. A holder or end effector 38, mounted on a distal end 40 of second arm 18, is provided for attaching tools and parts thereto.

Referring now to FIGS. 1–5, balancing means such as a fluid actuable piston and cylinder balancing arrangement 42 is connected between post 26 and first arm 16 to cause upward and downward pivotal movement of the distal end 24. An L shaped third mount 44, connected by bands 39 and 41 to post 26, mounts a bracket 46, attached to one end 47 of balancing arrangement 42, to pivotally connect the balancing arrangement to post 26 for movement about a pivot pin 48. Bracket 46 includes a plate 49 which extends along beneath the fluid. actuable piston and cylinder balancer 42. Bracket 46 has an upstanding portion 47' which is connected to the opposite end of the cylinder 42 as shown in FIG. 4.

Thus, an operator can manually move first arm 16 to move a part mounted on holder 38. Operation in response to such upward and downward pivotal movement is provided by cylinder 42 to provide a counter gravitational balancing during such upward movement and a similarly controlled balancing of such downward movement.

Actuating means such as a first electrical linear actuator 58 also connects post 26 and first arm 16, between the proximal and distal ends 22, 22' and 24, 24'. Actuator 58 is operable when controller 14 is in the "automatic mode" to cause upward and downward pivotal movement of arms 16 and 18. Thus, when load balancing mechanism 12 is in the automatic mode, first arm 16 and a load supported by second arm 18 can be automatically moved to a selected vertical position. When controller 14 is in the "manual mode", arms 16 and 18 may be moved up and down manually by the operator while actuator 58 is passive.

Actuator 58 is a DC ball screw type actuator available from LINAK. Actuator 58 is mounted on bracket 46 at 60 and 62. Actuator 58 has a linearly movable rod 63 terminating in ball type nose 64 pinned thereto at 65. Nose 64 is removably received in a complementary shaped socket 66 in bracket 52 as best shown in FIG. 5. Nose 64 and socket 66 serve to disconnectably couple actuator 58 to first arm 16, so that the first arm may be moved manually upwardly and downwardly without interference by actuator 58. Yet when actuator 58 is under automatic control by controller 14, first arm 16 may be raised by the actuator. Preferably, cylinder 42 provides an amount of counter gravitational balancing such that in the absence of a manual upward force first arm 16 drifts downwardly until socket 66 receives nose 64.

Driving rod 63 of actuator 58 and piston 54 of balancing arrangement 42 are disconnectably coupled as aforesaid through bracket 52. Actuating actuator 58 to move driving rod 63 outwardly causes piston 54 and first arm 16 to move in correspondence. Controller 14 is operable with actuator 58 to actuate driving rod 63 to a desired position thereby upwardly and downwardly moving first arm 16 to a selected vertical position. Thus, a part mounted on holder 38 can be automatically moved between vertical positions. In effect, actuator 58, in conjunction with controller 14 and balancing arrangement 42, automatically moves first arm 16 to a selected vertical position instead of an operator manually moving the first arm to the selected vertical position.

For example, a part located on the floor initially is mounted on holder 38. Controller 14 then enables actuator 58 to set load balancing mechanism 12 in the automatic mode. In the automatic mode, actuator 58 automatically moves first arm 16 and the part mounted on holder 38 to a selected vertical position. Moving the part off of the floor to the selected vertical positioned is performed for such reasons as facilitating the insertion of the part by an operator into a larger assembly.

Specifically, once the part is automatically moved to the selected vertical position, controller 14 disables actuator 58 to set load balancing mechanism 12 in the manual mode. In the manual mode, the operator can manually move first arm 16 to place the part into the larger assembly. Controller 14 then causes actuator 58 to set load balancing mechanism 12 back to the automatic mode. Controller 14 enables actuator 58 in response to the operator activating a control switch or the first arm being manually moved to an initial return position. Actuator 58 then automatically moves first arm 16 to a position adjacent the floor to retrieve another part so that the process may be repeated.

In assembly line operations, repeatedly moving parts to the same position adjacent larger indexed assemblies increases assembly speed and minimizes worker effort. Controller 14, balancing means 42, and actuator 58 are operable with one another to move parts between vertical positions automatically and accurately.

Figure 6:
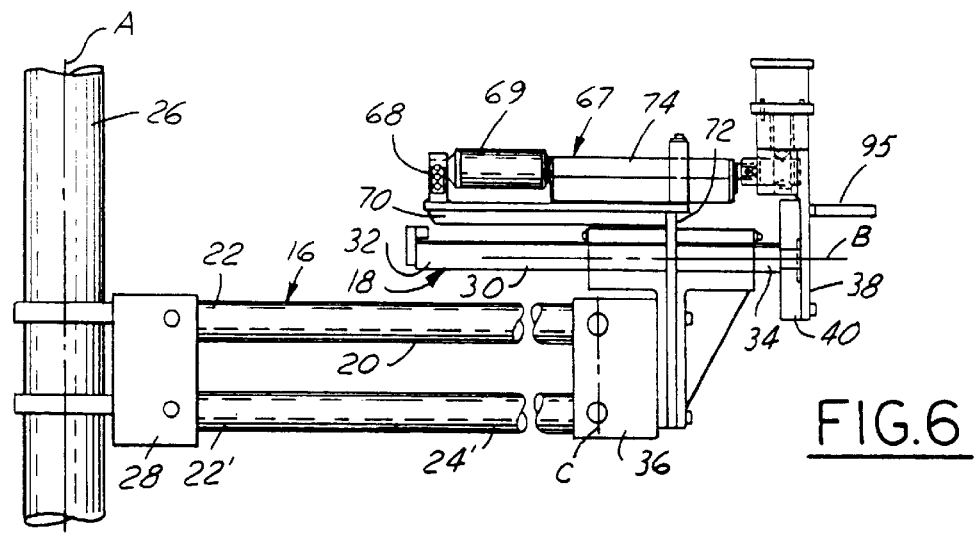
FIG. 6 is a side elevational view of the post, the second arm, and the second arm actuator illustrating the second arm in a retracted position.
Figure 7:
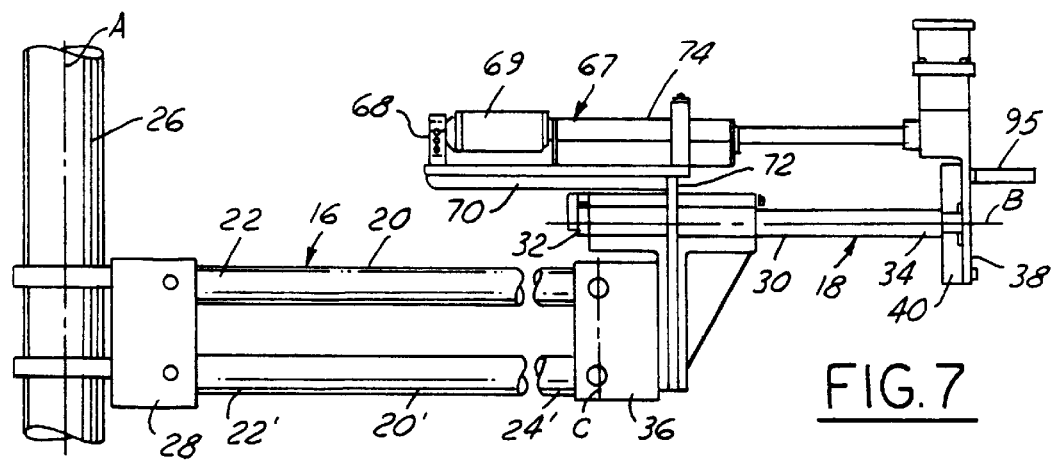
FIG. 7 is a side elevational view of the post, the second arm, and the second arm actuator illustrating the second arm in an extended position.

Referring now to FIGS. 6 and 7 with continual reference to FIGS. 1 and 2, second mount 36 has a generally vertical axial orientation C that is substantially parallel to the vertical axis A of post 26. Second mount 36 maintains its axial orientation as first arm 16 is pivoted in the vertical plane because of the parallelogram linkage arrangement of the first arm. A load carrying fork 95 is shown mounted on distal end 40 of second arm 18.

Second arm 18 is repositionable along its longitudinal axis B with respect to second mount 36 for adjusting the length or reach of the load balancing mechanism. The parallel linkage arrangement of first arm 16 wherein the parallel spaced members 20 and 20' renders the amount of counter balancing force required by balancing arrangement 42 to balance the balancing mechanism essentially independent of the longitudinal positioning of second arm 18 for a given load supported on holder 38.

As second arm 18 is extended or retracted, the varying moments about second mount 36 are communicated through parallel spaced members 20 and 20' to first mount 28 and not to balancing arrangement 42. Thus, an operator using the balancing mechanism need only overcome the friction therein to raise and lower the load and will not need to apply a greater and lesser force to raise and lower the load depending on how far out second arm 18 has been extended. Balancing arrangement 42 may include a pressure controller of the kind disclosed in U.S. Pat. No. 4,591,128 (not specifically shown). The pressure controller maintains a generally constant pressure for equilibrium balancing of the load on second arm 18 and adjustment of the pressure to accommodate variations in weight of the load carried by holder 38.

Actuating means such as a second electrical linear actuator 67 is operable with second arm 18 and controller 14 to automatically extend and retract the second arm along the longitudinal axis B when load balancing mechanism 12 is in the automatic mode. Thus, second arm 18 and a load mounted on distal end 40 of the second arm can be automatically moved to a selected longitudinal position. Actuator 67 is a DC ball screw type actuator driven by a motor 69. Actuator 67 is mounted at one end 66 to a fifth mount 68. Fifth mount 68 is part of a larger support 70 to which actuator 67 fastens. A bracket 72 connects support 70, fifth mount 68, and actuator 67 to bracket 36 of first arm 16.

Actuator 67 includes a driving rod 74 which is connected to holder 38. Thus, actuating actuator 67 to move driving rod 74 causes holder 38 and second arm 18 to move in correspondence. Controller 14 is operable with actuator 67 to actuate driving rod 74 thereby extending and retracting second arm 18 to a selected longitudinal position.

Figure 8:
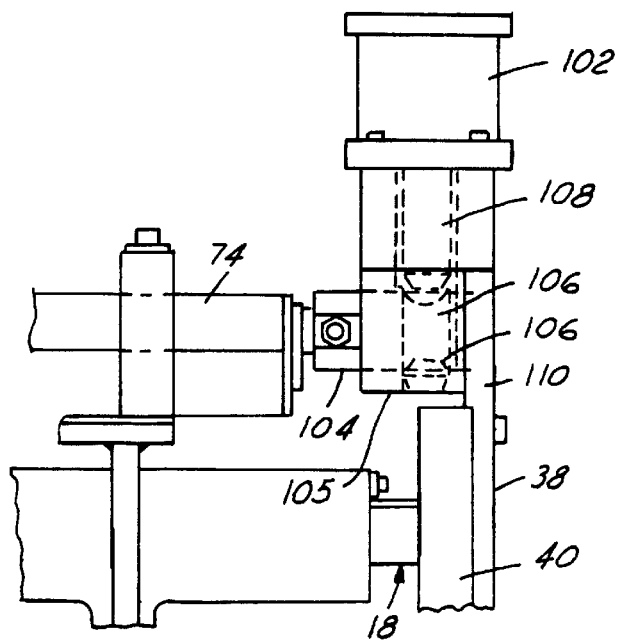
FIG. 8 is an enlarged view of the corresponding circled area 8 shown in FIG. 2.

As shown in FIG. 8, driving rod 74 is connected to a retaining member 104. Retaining member 104 fits within a cavity of a block member 105. Retaining member 104 includes a grooved portion 106. A cylinder 102 is positioned adjacent block member 105. A bracket 110 connects driving rod 74, cylinder 102, and block member 105 to distal end 40 of second arm 18.

Cylinder 102 has a pressurized rod 108 which is extendible into the cavity of block member 105 to engage into grooved portion 106 of retaining member 104 when the load balancing mechanism is in the automatic mode. Thus, when controller 14 causes actuator 67 to move driving rod 74, cylinder 102, block member 105, bracket 109, and second arm 18 follow the movement in correspondence.

In the manual mode, rod 108 is disengaged from grooved portion 106 of retaining member 104. Cylinder 102 serves to disconnectably couple actuator 67 to second arm 18, so that second arm 18 may be moved manually longitudinally outward and inward without interference by actuator 67. The transition between automatic and manual modes may occur when the operator activates a control switch or when second arm 18 reaches a selected longitudinal position. Thus, a part mounted on holder 38 can be automatically moved between longitudinal positions.

For example, a part located on the floor initially is mounted on holder 38. Controller 14 then enables actuator 58 to move first arm 16 and the part mounted on holder 38 to a selected vertical position. Controller 14 then enables actuator 67 to move second arm 18 to a selected longitudinal position. Thus, another degree of movement for automatically moving the part mounted on holder 38 is available with the use of actuator 67. Of course, the part mounted on holder 38 can be manually moved by an operator both vertically and longitudinally by moving first arm 16 and second arm 18, respectively, after controller 14 disables actuator 58 and actuator 67.

Figure 9:
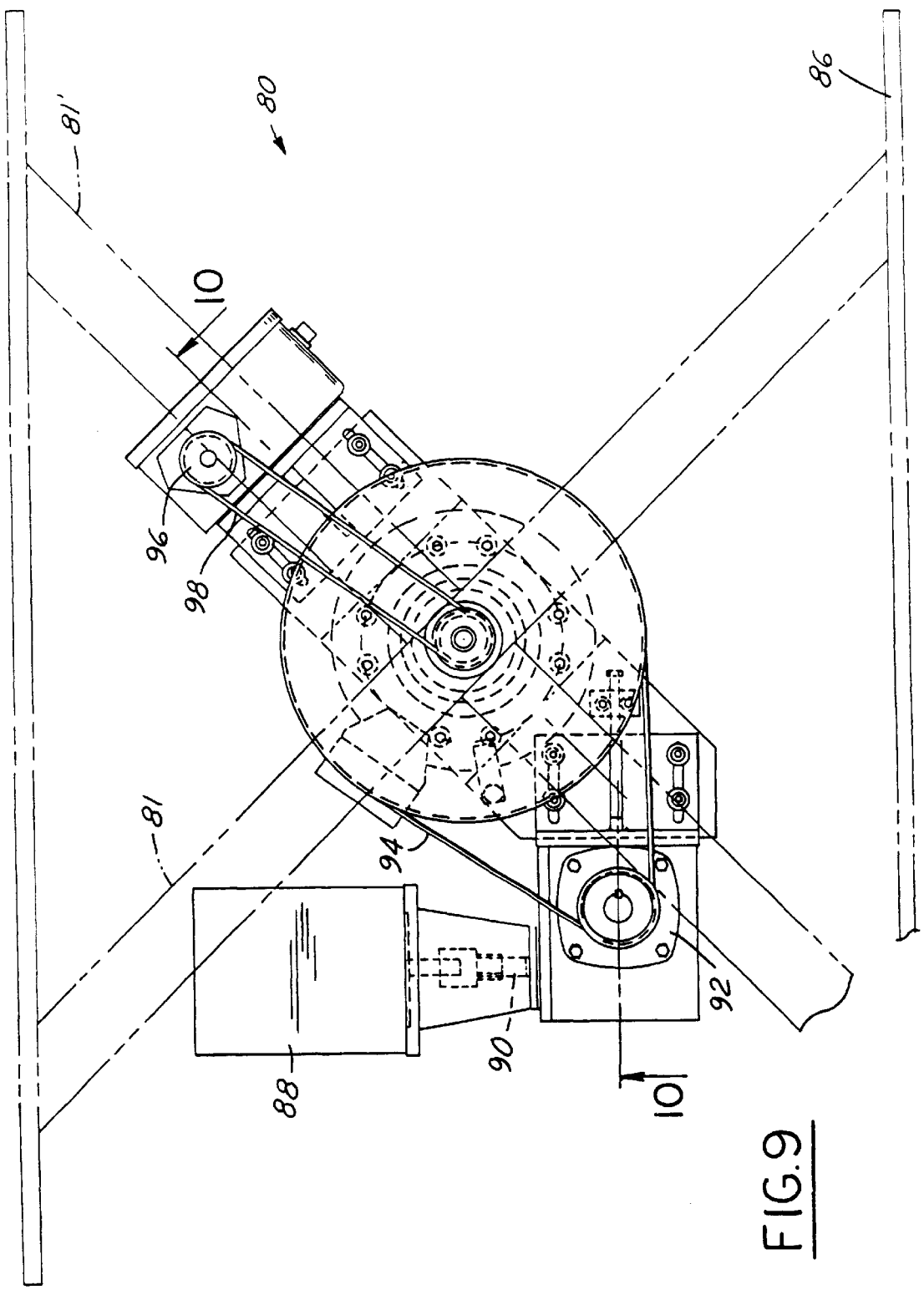
FIG. 9 is a top view of FIG. 1 looking down on the overhead bridge and trolley arrangement.
Figure 10:
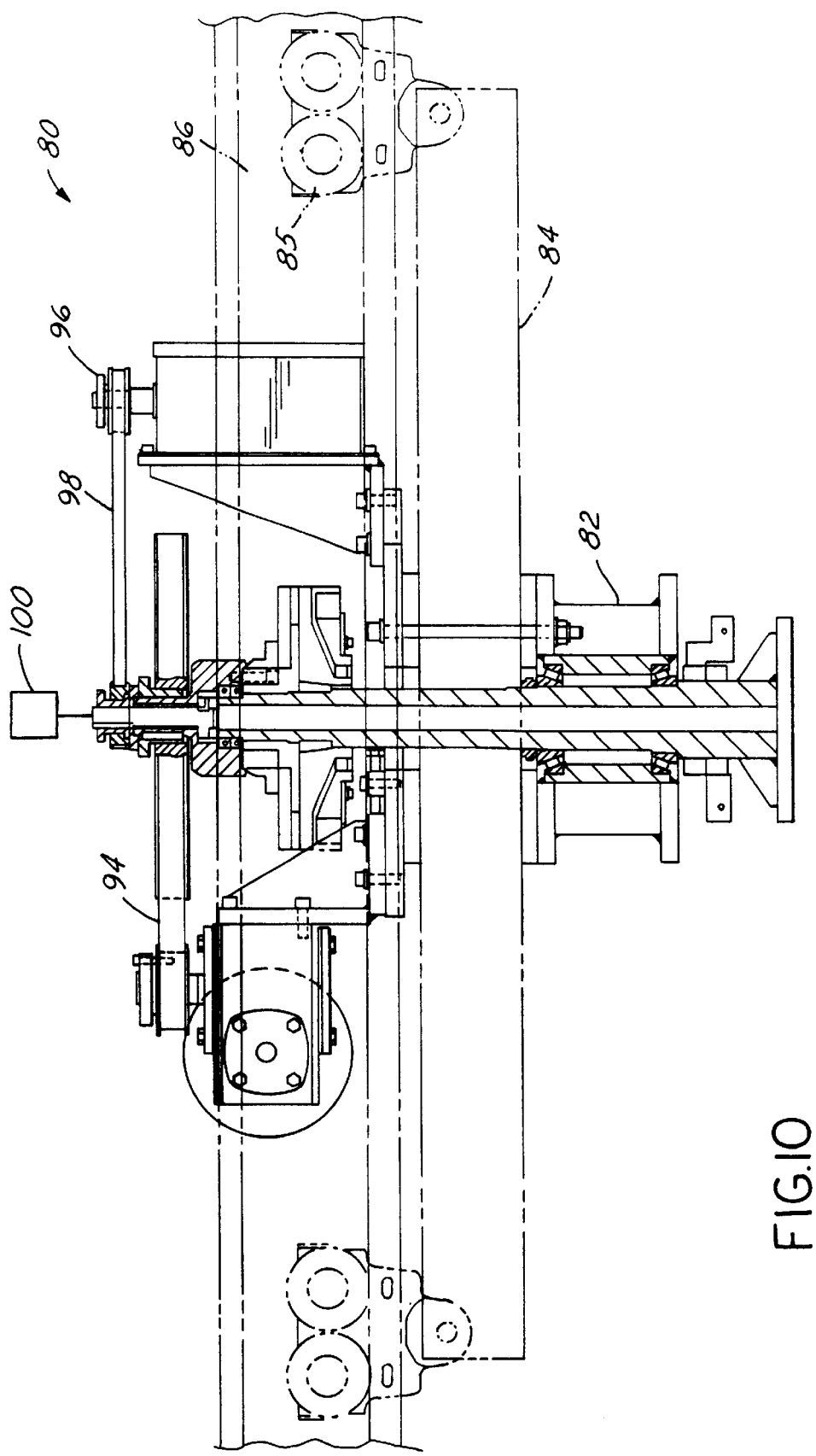
FIG. 10 is a view of the semi-automated load balancing mechanism along the line 10—10 shown in FIG. 9.

Referring now to FIGS. 1, 9, and 10, load balancing mechanism 12 includes a base 80 having crossing support members 81 and 81' and a bearing member 82 adjacent the base rotatable supporting post 26 for its rotational movement about the vertical axis A. Preferably, base 80 is a trolley 84 having wheels 85 supported for movement on a bridge 86 for overhead movement of load balancing mechanism 12. A motor may be connected to wheels 85 to drive them (not specifically shown). An optional brake may be provided on base 80 to control the rotational movement of post 26 when large loads are supported by holder 38 (not specifically shown). A stop may also be provided on base 80 to limit the number of degrees of rotation post 26 can be rotated (not specifically shown).

A motor 88 having a drive shaft 90 operable with a gear worm reducer 92 to rotate post 26 to horizontally move arm 16 is provided with base 80. Gear worm reducer 92 includes a belt 94 operable with bearing member 82 to rotate post 26. A belt drive 96 having a timing belt 98 operable with post 26 is also provided with base 80. Controller 14 controls motor 83 and belt drive 96 to rotate post 26 and arm 16 when load balancing mechanism 12 is in the automatic mode. Thus, another degree of movement for automatically moving a part mounted on holder 38 (as by fork 95) is available with the use of motor 88 and bearing member 82. Of course, the part mounted on holder 38 can be manually moved to a horizontal position by an operator moving arm 16 horizontally when load balancing mechanism 12 is in the manual mode.

An optical angular encoder 100 is coupled to post 26 to determine the angular or horizontal position of the post. Encoder 100 provides information regarding the angular position of post 26 to controller 14. Controller 14 uses this information to control motor 88 to move arm 16 between selected angular positions.

In operation, semi-automated load balancing mechanism 10 moves a part from one place to another automatically. Initially, a part is placed on fork 95 of holder 38 at an initial position. Controller 14 then energizes a clutch to engage motor 88 to rotate post 26 and arm 16 to a selected angular position. Controller 14 then de-energizes the clutch to disengage motor 88 when post 26 and arm 16 reach the selected angular position. Controller 14 then enables actuator 58 to move first arm 16 to a selected vertical position. Finally, controller 14 enables actuator 67 to move second arm 18 to a selected longitudinal position. Controller 14 disables actuator 58 and actuator 67 to set load balancing mechanism 12 in the manual mode. An operator can then move first arm 16 vertically and horizontally and move second arm 18 longitudinally to move the part placed on holder 38. After the part is removed from holder 38, controller 14 enables motor 88, actuator 58, and actuator 67 to move load balancing mechanism 12 back to the initial position to repeat the process.

Thus it is apparent that there has been provided, in accordance with the present invention, a semi-automated load balancing mechanism that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A semi-automated load balancing mechanism having automatic and manual modes, the mechanism comprising:

a post having a vertical axis;

a first arm pivotally mounted to the post for upward and downward pivotal movement;

constant force balancing means connected to the post and the first arm for equilibrium balancing upward and downward pivotal movement of the arm and a load supported by the first arm;

a first actuator connected to the post and disconnectably coupled to the first arm, the first actuator being extensible and retractable to pivotally move upward and downward the first arm; and a controller connected to the first actuator, wherein the controller causes the first actuator to automatically move the first arm to a selected vertical position and disables the first actuator once the first arm is at the selected vertical position to allow an operator to disconnect the first actuator from the first arm at its coupling and to manually move the first arm to move the load in a vertical direction independent of the first actuator.

2. The mechanism of claim 1 further comprising:

rotating means for rotating the first arm about the vertical axis of the post to horizontally displaced positions, wherein the controller is connected to the rotating means and causes the rotating means to automatically move the first arm to a selected horizontal position and disables the rotating means once the first arm is at the selected horizontal position to allow an operator to manually move the first arm to move the load in a horizontal direction.

3. The mechanism of claim 1 further comprising:

a second arm mounted to the first arm, wherein the second arm is movable along a longitudinal axis relative to the vertical axis of the post to move the load along the longitudinal axis; and a second actuator connected to the first arm and disconnectably coupled to the second arm, the second actuator being extensible and retractable to longitudinally move the second arm;

wherein the controller is connected to the second actuator and causes the second actuator to automatically move the second arm to a selected longitudinal position and disables the second actuator once the second arm is at the selected longitudinal position to allow an operator to disconnect the second actuator from the second arm at its coupling and to manually move the second arm to move the load in a longitudinal direction independent of the second actuator.

4. The mechanism of claim 3 wherein:

the first and second actuators are linear actuators.

5. The mechanism of claim 1 wherein:

the balancing means is a fluid pressure piston and cylinder balancing arrangement.

6. The mechanism of claim 5 wherein:

the piston and cylinder balancing arrangement includes a pressure controller for maintaining a constant pressure for equilibrium balancing of the load.

7. The mechanism of claim 1 wherein:

the first actuator is coupled directly to the constant force balancing means to pivotally move upward and downward the first arm and the load.

8. A semi-automated load balancing mechanism having automated and manual modes, the mechanism comprising:

a post having a vertical axis;

first and second arms;

a first mount for pivotally mounting the first arm to the post, wherein the first arm is movable upward and downward to move in a vertical plane;

a second mount for mounting the second arm to the first arm, wherein the second arm is extensible and retractable to move along a longitudinal axis in a horizontal plane;

constant force balancing means connected to the post and the first arm for equilibrium balancing upward and downward pivotal movement of the first arm;

a first actuator connected to the post and disconnectably coupled to the first arm, the first actuator being extensible and retractable to pivotally move upward and downward the first arm to a selected vertical position;

a second actuator connected to the second mount and disconnectably coupled to the second arm, the second actuator being extensible and retractable to longitudinally move the second arm to a selected longitudinal position;

rotating means for rotating the first arm about the vertical axis of the post to a selected horizontal position; and a controller connected to the first and second actuators and the rotating means, wherein the controller enables the first and second actuators and the rotating means to automatically move the arms from an initial position to a final position and then disables the first and second actuators and the rotating means to allow an operator to disconnect the first and second actuators from their respective arms at their couplings and to manually move the arms independent of the first and second actuators and the rotating means.

9. The mechanism of claim 8 wherein:

the second mount has a vertical axis orientation substantially parallel to the vertical axis of the post and the second mount maintains its orientation as the first arm is pivoted.

10. The mechanism of claim 8 wherein:

the first arm includes upper and lower parallel spaced members having first and second ends arranged to form a parallel linkage between the first and second ends.

11. The mechanism of claim 8 wherein:

the rotating means includes a base and a bearing member rotatable supporting the post for rotational movement of the first arm about the vertical axis of the post.

12. The mechanism of claim 11 wherein:

the base is a movable trolley.

13. The mechanism of claim 12 further comprising:

a bridge for mounting the trolley thereto for overhead movement of the post.

14. The mechanism of claim 11 wherein:

the rotating means includes an encoder operable with the post for determining the horizontal position of the post.

* * * * *